(12) United States Patent
Yamashita

(10) Patent No.: US 6,571,802 B1
(45) Date of Patent: Jun. 3, 2003

(54) MOLDED ARTICLE OF BIODEGRADABLE CELLULOSE ACETATE AND FILTER PLUG FOR SMOKING ARTICLE

(75) Inventor: Yoichiro Yamashita, Tokyo (JP)

(73) Assignee: Japan Tobacco Inc., Tokyo (JP)

( * ) Notice: Subject to any disclaimer, the term of this patent is extended or adjusted under 35 U.S.C. 154(b) by 0 days.

(21) Appl. No.: 09/450,650

(22) Filed: Nov. 30, 1999

Related U.S. Application Data

(63) Continuation of application No. PCT/JP99/01597, filed on Mar. 29, 1999.

(30) Foreign Application Priority Data

Mar. 31, 1998 (JP) .......................................... 10-086769

(51) Int. Cl.7 .......................... A24D 3/06; C09J 105/00; C08L 1/12
(52) U.S. Cl. ...................... 131/332; 131/331; 131/334; 428/364; 428/393; 428/339; 106/162.7; 106/162.72; 106/170.26; 106/170.42; 106/170.46; 106/171.1
(58) Field of Search ................................. 131/345, 332, 131/331, 342, 343, 334; 264/148; 493/39, 47; 428/364, 393, 339; 106/162.72, 162.7, 170.1, 170.11, 170.13, 170.15, 170.26–170.29, 170.33–170.37, 170.4, 170.41–170.44, 170.46, 171.1; 523/100, 124

(56) References Cited

U.S. PATENT DOCUMENTS

| | | | | |
|---|---|---|---|---|
| 4,909,854 A | * | 3/1990 | Light et al. | 131/276 |
| 5,161,549 A | * | 11/1992 | Rosario | 131/331 |
| 5,478,386 A | * | 12/1995 | Itoh et al. | 106/169 |
| 5,491,024 A | | 2/1996 | Brodof et al. | |
| 5,501,238 A | * | 3/1996 | Von Borstel et al. | 131/331 |
| 5,678,577 A | * | 10/1997 | Matsumura et al. | 131/331 |
| 5,913,311 A | * | 6/1999 | Ito et al. | 131/345 |
| 6,248,267 B1 | * | 6/2001 | Hosako et al. | 264/11 |

FOREIGN PATENT DOCUMENTS

| | | | |
|---|---|---|---|
| CN | 1150952 A | | 6/1997 |
| EP | 0597478 A1 | | 5/1994 |
| EP | 783841 | * | 2/1997 |
| EP | 0 783 841 A1 | | 7/1997 |
| JP | A6-199901 | | 7/1994 |
| JP | A7-75542 | | 3/1995 |
| JP | A8-169902 | | 7/1996 |
| WO | WO 97/05790 | * | 2/1997 ................. 131/345 |

OTHER PUBLICATIONS

Official Action issued in corresponding Korean Application No. 10–1999–7010994, Mailing Date: Jan. 30, 2002 (with translation).

* cited by examiner

Primary Examiner—Steven P. Griffin
Assistant Examiner—Dionne A. Walls
(74) Attorney, Agent, or Firm—Birch, Stewart, Kolasch & Birch, LLP

(57) ABSTRACT

A molded article molded from a cellulose acetate composition comprising, contained in cellulose acetate, a composite material of a decomposition accelerating agent formed of at least one compound selected from the group consisting of oxygen acid of phosphorus, oxygen acid of sulfur, oxygen acid of nitrogen, a partial ester or hydrogen salt of these oxygen acids, carbonic acid and its hydrogen salt, a sulfonic acid and a carboxylic acid, with a reaction controlling agent formed of at least one compound selected from the group consisting of a nitrogen-containing compound, a hydroxy compound, an oxygen-containing heterocyclic compound and a sulfur-containing heterocyclic compound.

12 Claims, No Drawings

MOLDED ARTICLE OF BIODEGRADABLE CELLULOSE ACETATE AND FILTER PLUG FOR SMOKING ARTICLE

CROSS REFERENCE TO RELATED APPLICATIONS

This is a continuation of Application No. PCT/JP99/01597, filed Mar. 29, 1999.

BACKGROUND OF THE INVENTION

The present invention relates to a molded article of biodegradable cellulose acetate and a filter plug for a smoking article.

Cellulose acetate is widely used as various molded articles, for example, fibers for tobacco filter materials and for woven fabric for clothes, and as films, as well as molded articles prepared by an injection molding, an extrusion molding, etc.

Cellulose acetate, which is prepared by converting cellulose into an acetic acid ester, is essentially a biodegradable substance. However, the biodegradability of cellulose acetate is not necessarily satisfactory in practice.

Specifically, even if buried in, for example, soil, a molded article made of cellulose acetate retains its original shape for 1 or 2 years. It takes a very long time for the molded article to be decomposed completely by biodegradation. These molded articles are handled as waste materials in some cases so as to be used for the land reclamation. In other cases, these molded articles are not recovered so as to be left as they are in the natural environment. It follows that it is very important to accelerate the biodegradability of cellulose acetate.

Under the circumstances, various researches are being made vigorously on the biodegradability of cellulose acetate. According to reports on the researches, the biodegradability of cellulose acetate is dependent on DS (Degree of Substitution: the number of acetyl groups per anhydroglucose monomer). To be more specific, as DS of cellulose acetate decreases, the biodegradation rate of cellulose acetate becomes faster. The mechanism of biodegradation is considered to be as follows.

First of all, the acetyl group of cellulose acetate is broken by an extracellular enzyme released from bacteria, leading to decrease in the DS value of cellulose acetate. Then, the cellulose acetate having its DS value decreased is readily undergone an enzyme decomposition by cellulase, etc. widely distributed in the environment so as to receive finally a biological metabolism and, thus, to be decomposed into carbon dioxide and water. The rate-limiting step of the biodegradation rate is considered to be the initial breakage of the acetyl group.

Based on these ideas, several methods have been proposed for accelerating the biodegradation rate of cellulose acetate. For example, Japanese Patent Disclosure (Kokai) No. 6-199901 discloses a method of controlling the biodegradability of cellulose acetate by adding an acid compound having an acid dissociation constant larger than that of acetic acid to cellulose acetate. In this method, however, the cellulose acetate chemically brings about a hydrolysis under the influence of the acid compound immediately after the time when the acid compound is added to the cellulose acetate, and the DS value of the cellulose acetate begins to be decreased. Since the DS value of the cellulose acetate composition (article) having the acid compound added thereto is thus decreased with time, it is impossible to maintain the DS value of the starting cellulose acetate.

The DS value of cellulose acetate greatly affects the function of the cellulose acetate article. When it comes to, for example, a filter for tobacco, the taste of the tobacco is greatly changed by the change in the DS value of cellulose acetate. Naturally, in terms of the quality control of the tobacco article, it is quite undesirable for the DS value of cellulose acetate used as a filter for tobacco to be changed with time from the design value under the ordinary environment, up to the time when the tobacco is smoked.

Further, the chemical hydrolysis of the acetyl group of cellulose acetate occurring in the presence of the acid compound produces acetic acid with progress of the chemical hydrolysis, i.e., with decrease in the DS value of cellulose acetate. In other words, the acetyl group eliminated from cellulose acetate is liberated as acetic acid. The liberated acetic acid imparts a strong acetic acid odor to the cellulose acetate article. The acetic acid odor is not a desirable factor in various articles. In the case of, for example, a filter for tobacco, the acetic acid odor markedly deteriorates the taste of tobacco.

BRIEF SUMMARY OF THE INVENTION

Accordingly, an object of the present invention is to provide a means for accelerating the biodegradability of cellulose acetate, which permits suppressing the change with time in the DS value of cellulose acetate and also permits suppressing the generation of the acetic acid odor.

As a result of an extensive research conducted in an attempt to achieve the above-noted object, the present inventors have found that, by complexing a certain decomposition accelerating agent which accelerates the decomposition of cellulose acetate with a certain reaction controlling agent which suppresses the decomposition reaction of cellulose acetate, the decomposition accelerating function of the decomposition accelerating agent can be suppressed under the ordinary use conditions of cellulose acetate, but the composite material dissociates its complexed state only when the cellulose acetate is brought into contact with water, to liberate the reaction controlling agent within the composite material, thereby allowing the decomposition accelerating agent to exhibit its decomposition accelerating function.

Thus, the above object is achieved according to the present invention by cellulose acetate, having contained therein, a composite material of a decomposition accelerating agent consisting of at least one compound selected from the group consisting of oxygen acid of phosphorus, oxygen acid of sulfur, oxygen acid of nitrogen, a partial ester or hydrogen salt of these oxygen acids, carbonic acid and its hydrogen salt, a sulfonic acid, and a carboxylic acid with a reaction controlling agent consisting of at least one compound selected from the group consisting of a nitrogen-containing compound, a hydroxy compound, an oxygen-containing heterocyclic compound, and a sulfur-containing heterocyclic compound.

The cellulose acetate composition of the present invention containing cellulose acetate and a composite material, contained in the cellulose acetate, of the decomposition accelerating agent with the reaction controlling agent permits suppressing the change with time in the DS value of the cellulose acetate. Therefore, the composition of the present invention permits maintaining the article performance as designed and also permits suppressing the acetic acid odor. In addition, the cellulose acetate composition of the present invention provides a molded article that begins to be decomposed only when the article is brought into contact with water.

The cellulose acetate composition of the present invention is provided as a molded article such as fibers.

According to another aspect of the present invention, there is provided a filter plug for tobacco, comprising cellulose acetate fibers, characterized in that each of the cellulose acetate fibers contains, in at least a surface region thereof, a composite material of a decomposition accelerating agent consisting of at least one compound selected from the group consisting of oxygen acid of phosphorus, oxygen acid of sulfur, oxygen acid of nitrogen, a partial ester or hydrogen salt of these oxygen acids, carbonic acid and its hydrogen salt, a sulfonic acid and a carboxylic acid, with a reaction controlling agent consisting of at least one compound selected from the group consisting of a nitrogen-containing compound, a hydroxy compound, an oxygen-containing heterocyclic compound, and a sulfur-containing heterocyclic compound.

In the present invention, it is desirable for the cellulose acetate to have a DS value of 2.0 to 2.6.

Also, in the present invention, the decomposition accelerating agent preferably consists of at least one compound selected from the group consisting of phosphoric acid, polyphosphoric acid, phytic acid, starch phosphate, cellulose phosphate, calcium hydrogenphosphate, lecithin and phosphoric acid di-2-ethylhexyl ester; and phosphoric ester of 2-hydroxyethyl methacrylate, phosphoric ester of 2-hydroxyethyl phenyl methacrylate, alkyl phosphoric ester of 2-hydroxyethyl methacrylate, and polymers and copolymers thereof. Further, the reaction controlling agent preferably consists of at least one compound selected from the group consisting of a compound having a pyrrolidone structure, a compound having an oxazolidone structure, a compound having an imide structure, a compound having a pyridine structure, a compound having an amine oxide structure, a compound having a pyrazine structure, polyvinyl alcohol or a derivative thereof, alkyl cellulose, hydroxyalkyl cellulose, sucrose fatty acid ester, propylene glycol fatty acid ester, sorbitan fatty acid ester, glycerin fatty acid ester, polyoxyethylene glycerin fatty acid ester, polyoxyethylene sorbitan fatty acid ester, polyoxyethylene sorbitol fatty acid ester, polyoxyethylene fatty acid amide, and fatty acid alkanol amide.

In a preferred embodiment of the present invention, the decomposition accelerating agent is contained in an amount of 0.01 to 40% by weight based on the cellulose acetate amount, and/or the reaction controlling agent is contained in an amount of 0.01 to 50% by weight based on the cellulose acetate amount.

DETAILED DESCRIPTION OF THE INVENTION

The present invention will be described below in detail.

The cellulose acetate used in the present invention may be any cellulose acetate, and its DS value is not particularly limited. For example, cellulose diacetate having a DS value of 2.0 to 2.6, or cellulose triacetate having a DS value larger than 2.6 can be used. Further, cellulose acetate having a DS value 2.0 or less, which has a high biodegradability, may be used. Particularly, in the case of manufacturing a filter for tobacco, it is desirable in terms of the taste of the tobacco to use cellulose acetate having a DS value of 2.0 to 2.6.

The composite material contained in cellulose acetate according to the present invention is the one prepared by complexing a predetermined decomposition accelerating agent with a predetermined reaction controlling agent by a chemical interaction (e.g., hydrogen bond).

The decomposition accelerating agent serves to accelerate the chemical hydrolysis of cellulose acetate, and is selected according to the present invention from the group consisting of oxygen acid of phosphorus, oxygen acid of sulfur, oxygen acid of nitrogen, a partial ester or hydrogen salt of these oxygen acids, carbonic acid and its hydrogen salt, a sulfonic acid and a carboxylic acid. A mixture of two or more of these compounds can also be used.

The oxygen acid, which is also called an oxoacid or an oxyacid, is an acid in which hydrogen that can be dissociated as a proton is bonded to an oxygen atom, and is preferably represented by a general formula

$$EO_n(OH)_m$$

where E represents phosphorus, sulfur or nitrogen. In a suitable case, a condensate thereof is included in the oxygen acid. More specifically, the oxygen acid of phosphorus includes phosphoric acid (phosphoric acid used in the present specification represents orthophosphoric acid), pyrophosphoric acid, metaphosphoric acid, polyphosphoric acid and hypophosphorous acid. The oxygen acid of sulfur includes sulfuric acid. Further, the oxygen acid of nitrogen includes nitric acid and nitrous acid. Oxygen acids other than those mentioned above include, for example, phosphorous acid, hypophosophorous acid and hyponitrous acid. On the other hand, a partial ester of the oxygen acid is a compound in which not all of the hydroxyl groups of the oxygen acid are esterified. For example, partial esters of the oxygen acid of phosphoric acid include $PO(OR)(OH)_2$ and $PO(OR)_2(OH)$. The hydrogen salt, which is also called acid salt, is a compound containing, at its an electrically positive component of a salt of an oxygen acid, a hydrogen ion capable of replacement by a cation. The hydrogen salt includes is salt for a compound in which the salt is in equilibrium with a hydrogen salt in water, as well as complex salts such as phosphate hydroxide.

The reaction controlling agent forms a composite material together with the decomposition accelerating agent by, for example, a hydrogen bond. The agent serves to suppress the decomposing action of the decomposition accelerating agent to decompose cellulose acetate under the ordinary storage conditions, and, when contacted with water, dissociates the complexed state to liberate the decomposition accelerating agent thereby enabling the decomposition accelerating agent to perform its decomposing action. The reaction controlling agent used in the present invention is selected from the group consisting of a nitrogen-containing compound, a hydroxy compound, an oxygen-containing heterocyclic compound, and a sulfur-containing heterocyclic compound. A mixture of two or more of these compounds can be used.

The nitrogen-containing compound is a compound having a nitrogen atom in its structure, and includes, for example, ammonia, amines, amine oxides, amides, urethanes, imides, nitro compounds, nitroso compounds, and nitrogen-containing heterocyclic compounds (compounds containing nitrogen as a member of the heterocyclic ring). The hydroxy compound is a compound having a hydroxyl group (—OH), and includes, for example, alcohols (including polyhydric alcohols), polyvinyl alcohols, polyglycerins and sugars. Further, the oxygen-containing heterocyclic compound is a compound containing oxygen as a member of the heterocyclic ring, while the sulfur-containing heterocyclic compound is a compound containing sulfur as a member of the heterocyclic ring.

In the present invention, the decomposition accelerating agent and the reaction controlling agent are contained in the cellulose acetate composition in the form of a complexed state formed by a chemical interaction (e.g., hydrogen bond).

Desirably such a composite material, and hence the decomposition accelerating agent and the reaction controlling agent are safe and can be supplied in large amounts at an acceptable price. Further, where cellulose acetate is formed into fibers for the manufacture of, for example, a filter for tobacco, a cellulose acetate solution (spinning solution) is spun in general from a spinning nozzle by a spinning method. In view of the particular manufacturing process, it is desirable for the decomposition accelerating agent and the reaction controlling agent used in the present invention to be soluble in a solvent used for dissolving cellulose acetate (such as acetone, methylene chloride/methanol mixed solvent, or dimethyl sulfoxide). Alternatively, where insoluble in such a solvent, these decomposition accelerating agent and the reaction controlling agent should preferably be capable of pulverization to such a degree as not to adversely affect the properties of the fiber in the spinning step.

In view of the safety, the ease of manufacture, and the effect of accelerating the biodegradability of cellulose acetate, it is desirable that the decomposition accelerating agent used in the present invention is phosphoric acid, polyphosphoric acid, or its partial ester or hydrogen salt. The partial ester or the hydrogen salt preferably include, for example, phytic acid, starch phosphate, cellulose phosphate, calcium hydrogenphosphate, lecithin, phosphoric acid di-2-ethylhexyl ester, phosphoric ester of HEMA (2-hydroxyethyl methacrylate), phenyl phosphoric ester of HEMA, alkyl phosphoric ester of HEMA, and homopolymers and copolymers of phosphoric ester of HEMA, phenyl phosphoric ester of HEMA and alkyl phosphoric ester of HEMA.

Also, in view of the safety, the ease of manufacture, and the effect of suppressing the acetic acid odor, the reaction controlling agent used in the present invention preferably consists of a compound having a pyrrolidone structure (e.g., 2-pyrrolidone, N-methyl-2-pyrrolidone or polyvinylpyrrolidone), a compound having an oxazolidone structure (e.g., 2-oxazolidone, 3-methyl-2-oxazolidone or polyvinyl oxazolidone), a compound having an imide structure (e.g., phthalimide, succinimide, riboflavin or polyvinyl phthalimide), a compound having a pyridine structure (e.g., pyridine, nicotinic acid, nicotinic acid amide or polyvinyl pyridine), a compound having an amine oxide structure (e.g., N-methylmorpholine N-oxide, N-methyl piperidine N-oxide or triethyl amine N-oxide), a compound having a pyrazine structure (e.g., pyrazine or methyl pyrazine), polyvinyl alcohol or a derivative thereof (e.g., polyvinyl acetal or polyvinyl butyral), alkyl cellulose (e.g., methyl cellulose or ethyl cellulose), hydroxyalkyl cellulose (e.g., hydroxyethyl cellulose or hydroxybutyl cellulose), sucrose fatty acid ester, propylene glycol fatty acid ester, sorbitan fatty acid ester, glycerin fatty acid ester, polyoxyethylene glycerin fatty acid ester, polyoxyethylene sorbitan fatty acid ester, polyoxyethylene sorbitol fatty acid ester, polyoxyethylene fatty acid amide, or fatty acid alkanol amide. A mixture of two or more of these compounds can also be used.

In the present invention, it is possible to design the biodegradation rate of cellulose acetate and the level of suppressing the acetic acid odor of the molded article by controlling the addition amounts of the decomposition accelerating agent and the reaction controlling agent.

More specifically, the addition amount of the decomposition accelerating agent can be set optionally depending on the desired biodegradation rate. For example, where it is intended to accelerate the biodegradation rate, the decomposition accelerating agent should be added in a larger amount. However, in view of the moldability of the resultant cellulose acetate composition, it is desirable to add the decomposition accelerating agent in an amount of 0.01 to 40% by weight based on the cellulose acetate amount. More preferably, the decomposition accelerating agent should be added in an amount of 0.01 to 15% by weight based on the cellulose acetate amount.

The addition amount of the reaction controlling agent can be determined on the basis of the desired level of suppressing the acetic acid odor. Where, for example, it is intended to suppress the acetic acid odor of the molded article to a higher extent, a larger amount of the reaction controlling agent should be added. However, if the reaction controlling agent is added in an excessively large amount, the moldability of the cellulose acetate composition is lowered. On the other hand, if the addition amount of the reaction controlling agent is unduly small, it can not be expected to obtain a desired effect of suppressing the acetic acid odor. Under the circumstances, the amount of the reaction controlling agent added is preferably 0.01 to 50% by weight, more preferably 0.01 to 25% by weight, based on the cellulose acetate amount. Also, where it is intended to suppress completely the generation of the acetic acid odor from the cellulose acetate molded article, it is desirable to add the reaction controlling agent in an amount that is chemically equivalent or more to the addition amount of the decomposition accelerating agent.

The cellulose acetate composition of the present invention can be formed into molded articles of various structure by the ordinary methods, except that the cellulose acetate composition of the present invention contains the particular composite material. For example, a reaction controlling agent and a decomposition accelerating agent can be added first to a solution of cellulose acetate in a solvent such as acetone or methylene chloride, followed by molding the resultant composition by the ordinary method. Alternatively, a reaction controlling agent and a decomposition accelerating agent can be added by melting and mixing into a thermally moldable cellulose acetate containing a plasticizer or the like, followed by molding the resultant composition by the ordinary method.

Further, cellulose acetate fiber used for a tobacco filter can be prepared, for example, as follows.

First, a solution (spinning solution) containing cellulose acetate and a composite material of the present invention is prepared. As the solvent, a single solvent such as methylene chloride or acetone or a mixed solvent of, for example, methylene chloride and methanol can be used. The cellulose acetate concentration is generally 15 to 35% by weight, preferably 18 to 30% by weight. The decomposition accelerating agent and the reaction controlling agent are contained in the spinning solution in amounts falling within the ranges described previously. The spinning solution can be prepared by mixing a solution prepared by dissolving or dispersing the decomposition accelerating agent and the reaction controlling agent in a solvent for cellulose acetate with a solution prepared by dissolving cellulose acetate in a solvent for the cellulose acetate. Alternatively, the spinning solution can be prepared by directly adding the decomposition accelerating agent and the reaction controlling agent to the solution of cellulose acetate. In the latter case, it is desirable to add the reaction controlling agent first, followed by adding the decomposition accelerating agent in order to efficiently derive the effect of the reaction controlling agent.

The cellulose acetate spinning solution thus prepared, which contains the composite material of the present invention, is supplied to a spinning nozzle device and spun by a dry spinning method, in which the spinning solution is discharged into an atmosphere of high temperatures, so as to obtain a cellulose acetate fiber. It is possible to employ a wet spinning method in place of the dry spinning method. Although it is possible to spin a uniformly dispersed spinning solution as it is into a fiber as described above, it is also possible to employ a composite spinning into, e.g., fiber side-by-side or sheath-core type fibers by using a cellulose acetate spinning solution containing the composite material and a cellulose acetate spinning solution that does not contain the composite material, such that at least the cellulose acetate composition containing the composite material papers the fiber surface. Additional additives can also be used together in preparing the spinning solution as far as the characteristics of the spinning solution are not impaired. For example, where the spinning solution contains a photo-degradation accelerating agent such as titanium oxide, the photo-degradation accelerating effect is combined with the biodegradation accelerating effect of the present invention so as to further enhance the decomposition of the cellulose acetate composition. Further, it is possible to add, for example, a dispersing agent, an emulsifying agent, a plasticizer, a viscosity controlling agent, etc. to the composition of the present invention in order to improve the uniformity of the spinning solution or to control the viscosity of the spinning solution. As apparent from the above description, the cellulose acetate fibers of the present invention constituting the filter plug for tobacco each contain a composite material of the present invention in at least a surface region thereof. Incidentally, the cellulose acetate fibers may be in the form of fibril. Where the cellulose acetate fiber is in the form of fibril, it is desirable to use other materials described below or the cellulose acetate of the present invention in the form of usual fiber, together with the fibril.

The cellulose acetate fibers thus obtained are manufactured into a tobacco filter by the ordinary method. The manufacturing method of the filter and the construction of the filter are not particularly limited. For example, the tobacco filter can be manufactured as follows.

Specifically, the cellulose acetate fibers are made into a tow and, then, opened on a tobacco filter plug-making machine, followed by addition of a plasticizer (e.g., triacetyl glycerin) and subsequently forming the resultant material into the shape of a fibrous rod. Finally, the fibrous rod is cut into pieces of a desired length so as to obtain filter plugs. Incidentally, the total degree of fineness as the fiber bundle is set appropriately so as to facilitate the manufacture of the filter plug. Alternatively, a rod-like material can be formed on an ordinary plug making machine by using an nonwoven fabric prepared from short fibers prepared by cutting the cellulose acetate fibers into small pieces having a length of 1 to 100 mm. The cellulose acetate fiber of the present invention can be used singly for manufacturing a filter. It is also possible to use the cellulose acetate fiber of the present invention as one component together with other constituting materials for manufacturing a filter. Such other constituting materials include, for example, natural or semi-synthesized materials (e.g., pulp, linters, cotton, hemp, viscose rayon, copper ammonia rayon, lyocel, wool or a biodegradable polymer of a microorganism production type like polyhydroxy alkanoate); ordinary synthetic materials (e.g., polyolefin like polypropylene, polyester like polyethylene terephthalate, and polyamide); biodegradable synthetic materials (e.g., polylactic acid, polycaprolactone, polybutylene succinate and polyvinyl alcohol); and photo-degradable materials. These materials can be used in the form of fibers or nonwoven fabrics. In such a case, it is particularly desirable to use a material excellent in biodegradability. It is also possible to use a starch foam as a material excellent in biodegradability, though the starch foam is not a fiber.

In the method of manufacturing a filter for tobacco described above, a water-soluble adhesive can be used in place of the plasticizer. In the case of using a plasticizer, the cellulose acetate fibers are strongly bonded to each other by melt adhesion. As a result, the filter for tobacco discarded in the natural environment stably retains the rod shape over a long period of time. In the case of using a water-soluble adhesive, however, the bonded points among the cellulose acetate fibers are easily dissociated by a large amount of water (rain, sea water, river water, lake water, etc.) when the filter for tobacco is discarded in the natural environment. As a result, the rod shape of the filter for tobacco is readily collapsed. Where the rod shape is collapsed, the cellulose acetate fibers put in the natural environment is extended on, for example, a surface region of the soil, leading to a large contact area between the fiber and the environment of the microorganisms, which influences the biodegradation rate, with the result that the biodegradation of the tobacco filter is further accelerated. This further enhances the biodegradability of the tobacco filter, in cooperation with the acceleration of the biodegradability by the cellulose acetate of the present invention.

It should also be noted that the cellulose acetate fiber may be in the shape of either a staple or a filament. However, it is desirable for the cellulose acetate fiber to be shaped into fiber tows, where the cellulose acetate fiber is used to constitute a tobacco filter of the present invention. The total degree of fineness of the tows can be set optionally. For example, it is desirable to prepare bundle-like fiber tows by bundling 3,000 to 500,000 fibers each sized 0.5 to 15 deniers, followed by imparting 10 to 50 crimps per 25 mm length to the resultant fiber bundle. The cross sectional shape of each fiber, which is not particular limited in the present invention, may be circular, rectangular, etc. However, in view of the filtering performance of the tobacco filter, it is desirable for the fiber to have a multileaf-like cross sectional shape, particularly, a Y-shaped cross section, in view of the stability in the manufacturing process.

A cellulose acetate composition containing the additive noted above and a filter for tobacco are featured as follows. Specifically, the decomposition accelerating agent is stabilized by the chemical interaction (e.g., hydrogen bond) with the reaction controlling agent in the process of manufacturing a molded article of cellulose acetate composition and in the stage of the molded article. As a result, the decomposition accelerating agent does not cause a chemical hydrolysis of the cellulose acetate to take place. It follows that the molded article exhibits the properties of the molded article of the ordinary cellulose acetate not containing the composite material of the present invention. However, if the molded article of the present invention is discarded in the natural environment, the composite material of the decomposition accelerating agent with the reaction controlling agent, which is contained in the molded article, releases its interaction due to a large amount of water (rain, sea water, river water, lake water, etc.) so as to set free the decomposition accelerating agent. The free decomposition accelerating agent exhibits its function (decomposition accelerating function) for the first time. In other words, the combined use of the decomposition accelerating agent together with the reaction controlling agent can control the reactivity of the decomposition accelerating agent, which accelerates the biodegradability of cellulose acetate, both within the molded article and in the natural environment. In this way, the molded article of the present invention does not undergo the chemical hydrolysis of cellulose acetate in the stage wherein it is generally used as a molded article. Thus, the molded article of the present invention retains the properties (DS) of the starting material of cellulose acetate, and the odor of acetic acid is not generated. On the other hand, the molded article of cellulose acetate is biodegradably decomposed prominently in the natural environment by the function of the decomposition accelerating agent dissociated from the reaction controlling agent by contact with water.

The present invention will be described below by way of its Examples.

EXAMPLE 1

Cellulose acetate flakes (DS=2.5) were dissolved in acetone to have a concentration of 28% by weight, thus preparing a cellulose acetate solution. Polyvinylpyrrolidone (an average molecular weight (weight average molecular weight; the same apples in the following) of 25,000) was added in an amount of 25% by weight of the cellulose acetate to the solution, which was made uniform by stirring. Then, phosphoric acid was added in an amount of 5% by weight of the cellulose acetate, and again stirred to uniformity. The resultant cellulose acetate solution was cast on a glass plate and dried to obtain a cellulose acetate film having a thickness of about 100 μm. It was confirmed from the film thus obtained that the decomposition accelerating agent and the reaction controlling agent constituting the composite material were uniformly dissolved and dispersed in the film so as not to affect the moldability of the cellulose acetate film.

EXAMPLE 2

Cellulose acetate flakes (DS=2.5) were dissolved in acetone to have a concentration of 28% by weight, thus preparing a cellulose acetate solution. 2-pyrrolidone was added in an amount of 25% by weight of the cellulose acetate to the solution, which was made uniform by stirring. Then, phosphoric acid was added in an amount of 5% by weight of the cellulose acetate and again stirred to uniformity. The resultant cellulose acetate solution was cast on a glass plate and dried to obtain a cellulose acetate film having a thickness of about 100 μm. It was confirmed from the film thus obtained that the decomposition accelerating agent and the reaction controlling agent constituting the composite material were uniformly dissolved and dispersed in the film so as not to affect the moldability of the cellulose acetate film.

EXAMPLE 3

Cellulose acetate flakes (DS=2.5) were dissolved in acetone to have a concentration of 28% by weight, thus preparing a cellulose acetate solution. N-methylmorpholine N-oxide was added in an amount of 25% by weight of the cellulose acetate amount to the solution, which was made uniform by stirring. Then, phosphoric acid was added in an amount of 5% by weight of the cellulose acetate, and again stirred to uniformity. The resultant cellulose acetate solution was cast on a glass plate and dried to obtain a cellulose acetate film having a thickness of about 100 μm. It was confirmed from the film thus obtained that the decomposition accelerating agent and the reaction controlling agent constituting the composite material were uniformly dissolved and dispersed in the film so as not to affect the moldability of the cellulose acetate film.

EXAMPLE 4

Cellulose acetate flakes (DS=2.5) were dissolved in acetone to have a concentration of 28% by weight, thus preparing a cellulose acetate solution. Polyvinyl butyral (an average molecular weight of 2,000) was added in an amount of 25% by weight of the cellulose acetate to the solution, which was made uniform by stirring. Then, phosphoric acid was added in an amount of 5% by weight of the cellulose acetate and again stirred to uniformity. The resultant cellulose acetate solution was cast on a glass plate and dried to obtain a cellulose acetate film having a thickness of about 100 μm. It was confirmed from the film thus obtained that the decomposition accelerating agent and the reaction controlling agent constituting the composite material were uniformly dissolved and dispersed in the film so as not to affect the moldability of the cellulose acetate film.

EXAMPLE 5

Cellulose acetate flakes (DS=2.5) were dissolved in acetone to have a concentration of 28% by weight, thus preparing a cellulose acetate solution. Polyvinylpyrrolidone (an average molecular weight of 25,000) was added in an amount of 25% by weight of the cellulose acetate amount to the solution, which was made uniform by stirring. Then, polyphosphoric acid was added in an amount of 5% by weight of the cellulose acetate and again stirred to uniformity. The resultant cellulose acetate solution was cast on a glass plate and dried to obtain a cellulose acetate film having a thickness of about 100 μm. It was confirmed from the film thus obtained that the decomposition accelerating agent and the reaction controlling agent constituting the composite material were uniformly dissolved and dispersed in the film so as not to affect the moldability of the cellulose acetate film.

EXAMPLE 6

Cellulose acetate flakes (DS=2.5) were dissolved in acetone to have a concentration of 28% by weight, thus preparing a cellulose acetate solution. 2-pyrrolidone was added in an amount of 25% by weight of the cellulose acetate to the solution, which was made uniform by stirring. Then, polyphosphoric acid was added in an amount of 5% by weight of the cellulose acetate and again stirred to uniformity. The resultant cellulose acetate solution was cast on a glass plate and dried to obtain a cellulose acetate film having a thickness of about 100 μm. It was confirmed from the film thus obtained that the decomposition accelerating agent and the reaction controlling agent constituting the composite material were uniformly dissolved and dispersed in the film so as not to affect the moldability of the cellulose acetate film.

EXAMPLE 7

Cellulose acetate flakes (DS=2.5) were dissolved in acetone to have a concentration of 28% by weight, thus preparing a cellulose acetate solution. N-methylmorpholine N-oxide was added in an amount of 25% by weight of the cellulose acetate to the solution, which was made uniform by stirring. Then, polyphosphoric acid was added to the system in an amount of 5% by weight of the cellulose acetate and stirred to uniformity. The resultant cellulose acetate solution was cast on a glass plate and dried to obtain a cellulose acetate film having a thickness of about 100 μm. It was confirmed from the film thus obtained that the decomposition accelerating agent and the reaction controlling agent constituting the composite material were uniformly dissolved and dispersed in the film so as not to affect the moldability of the cellulose acetate film.

EXAMPLE 8

Cellulose acetate flakes (DS=2.5) were dissolved in acetone to have a concentration of 28% by weight, thus preparing a cellulose acetate solution. Polyvinyl butyral (an average molecular weight of 2,000) was added in an amount of 25% by weight of the cellulose acetate to the solution, which was made uniform by stirring. Then, polyphosphoric acid was added in an amount of 5% by weight of the cellulose acetate and stirred to uniformity. The resultant cellulose acetate solution was cast on a glass plate and dried to obtain a cellulose acetate film having a thickness of about 100 μm. It was confirmed from the film thus obtained that the decomposition accelerating agent and the reaction controlling agent constituting the composite material were uniformly dissolved and dispersed in the film so as not to affect the moldability of the cellulose acetate film.

COMPARATIVE EXAMPLE 1

Cellulose acetate flakes (DS=2.5) were dissolved in acetone to have a concentration of 28% by weight, thus preparing a cellulose acetate solution. Phosphoric acid was added in an amount of 5% by weight of the cellulose acetate to the solution, which was stirred to uniformity. The cellulose acetate solution thus obtained was cast on a glass plate and dried to obtain a cellulose acetate film having a thickness of about 100 μm.

COMPARATIVE EXAMPLE 2

Cellulose acetate flakes (DS=2.5) were dissolved in acetone to have a concentration of 28% by weight, thus preparing a cellulose acetate solution. Polyphosphoric acid was added in an amount of 5% by weight of the cellulose acetate to the solution, which was stirred to uniformity. The cellulose acetate solution thus obtained was cast on a glass plate and dried to obtain a cellulose acetate film having a thickness of about 100 μm.

COMPARATIVE EXAMPLE 3

Cellulose acetate flakes (DS=2.5) were dissolved in acetone to have a concentration of 28% by weight, thus preparing a cellulose acetate solution. This cellulose acetate solution was cast on a glass plate and dried to obtain a cellulose acetate film having a thickness of about 100 μm.

<Measurement of Acetic Acid Concentration and Evaluation of the Acetic Acid Odor Level>

The acetic acid odor level of each of the cellulose acetate films obtained in Examples 1–8 and Comparative Examples 1–3 was evaluated. The acetic acid concentration was measured by punching out a circular piece (a diameter of 5 cm) from each of the films immediately after the manufacture, which was put in an odor bag and left to stand in a constant temperature chamber of 50° C., followed by measuring the acetic acid concentration within the odor bag one week later by a gas detecting tube method. At the same time, the acetic acid odor level of the film was evaluated by an organoleptic examination method. Table 1 shows the results.

TABLE 1

Results of Acetic Acid Odor Evaluation of Various Cellulose Acetate Films

| Sample | Acetic Acid Concentration (ppm) | Acetic Acid Odor Level* |
|---|---|---|
| Example 1 | 0.8 | 0 |
| Example 2 | 12.0 | 1–2 |
| Example 3 | 0.2 | 0 |
| Example 4 | 31.0 | 2 |
| Example 5 | 0.8 | 0 |
| Example 6 | 12.0 | 1–2 |
| Example 7 | 0.1 | 0 |
| Example 8 | 30.0 | 2 |
| Comparative Example 1 | 40.0 | 3 |
| Comparative Example 2 | 44.0 | 3 |
| Comparative Example 3 | 0.8 | 0 |

* Acetic Acid Odor Level
0: Odor is not felt.
1: Odor is slightly felt.
2: Odor is felt.
3: Odor is strongly felt.

It is seen from the results given above that the use of a reaction controlling agent suppresses the generation level of the acetic acid odor derived from the addition of a decomposition accelerating agent. More specifically, it is seen that, in the process of manufacturing a molded article (film) of cellulose acetate and in the stage of the molded article, the decomposition accelerating agent is stabilized by the reaction controlling agent so as to suppress the function of the decomposition accelerating agent. Further, it is seen that the degree of suppressing the decomposition can be set as desired by suitably selecting the kind of the reaction controlling agent used.

EXAMPLE 9

Five kinds of cellulose acetate films were prepared as in Example 1, except that the amount of polyvinylpyrrolidone (an average molecular weight of 25,000) added was 5% by weight, 10% by weight, 15% by weight, 20% by weight and 30% by weight, respectively, of the cellulose acetate.

The relationship between the acetic acid odor level of the cellulose acetate film and the addition amount of polyvinylpyrrolidone was examined by using the cellulose acetate films prepared in Example 1, Comparative Example 1 and the cellulose acetate films having various addition amounts which were prepared in this Example. Table 2 shows the results. The evaluation test was conducted according to the methods in the above-mentioned acetic acid concentration measurement and the acetic acid odor level evaluation.

TABLE 2

Relationship between Acetic Acid Odor Level and Addition Amount of Polyvinyl-pyrrolidone of Cellulose Acetate Films

| Addition Amount of Polyvinyl-pyrrolidone (% by weight) | Acetic Acid Concentration (ppm) | Acetic Acid Odor Level |
|---|---|---|
| 0 | 40.0 | 3 |
| 5 | 5.0 | 1 |
| 10 | 1.7 | 0–1 |
| 15 | 1.1 | 0 |

TABLE 2-continued

Relationship between Acetic Acid
Odor Level and Addition Amount of
Polyvinyl-pyrrolidone of Cellulose
Acetate Films

| Addition Amount of Polyvinyl-pyrrolidone (% by weight) | Acetic Acid Concentration (ppm) | Acetic Acid Odor Level |
|---|---|---|
| 20 | 0.8 | 0 |
| 25 | 0.8 | 0 |
| 30 | 0.8 | 0 |

It is seen from the results given above that it is possible to set the generation level of the acetic acid odor derived from the addition of the decomposition accelerating agent at a desired value by selecting the addition amount of the reaction controlling agent.

EXAMPLE 10

Cellulose acetate films were prepared as in Example 3, except that N-methylmorpholine N-oxide was added in amounts of 1% by weight, 5% by weight, 10% by weight, 15% by weight, 20% by weight and 30% by weight, respectively, of the cellulose acetate.

The relationship between the acetic acid odor level of the cellulose acetate film and the addition amount of N-methylmorpholine N-oxide was examined by using the cellulose acetate films prepared in Example 3, Comparative Example 1 and the cellulose acetate films differing from each other in the addition amount of N-methylmorpholine N-oxide, which were prepared in this Example. Table 3 shows the results. The evaluation test was conducted according to the methods in the above-mentioned acetic acid concentration measurement and the acetic acid odor level evaluation.

TABLE 3

Relationship between Acetic Acid
Odor Level and Addition Amount of
N-methyl-morpholine N-oxide of
Cellulose Acetate Films

| Addition Amount of N-methyl-morpholine N-oxide (% by weight) | Acetic Acid Concentration (ppm) | Acetic Acid Odor Level |
|---|---|---|
| 0 | 40.0 | 3 |
| 1 | 3.2 | 1 |
| 5 | 0.4 | 0 |
| 10 | 0.3 | 0 |
| 15 | 0.3 | 0 |
| 20 | 0.2 | 0 |
| 25 | 0.2 | 0 |
| 30 | 0.1 | 0 |

It is seen from the results given above that it is possible to set the generation level of the acetic acid odor derived from the addition of the decomposition accelerating agent at a desired value by suitably selecting the addition amount of the reaction controlling agent.

EXAMPLE 11

A cellulose acetate film was prepared as in Example 1, except that the addition amount of polyvinylpyrrolidone (an average molecular weight of 25,000) was changed to 10% by weight of the cellulose acetate, and that the addition amount of phosphoric acid was changed to 1% by weight of the cellulose acetate.

The relationship between the acetic acid odor level of the cellulose acetate film and the addition amount of phosphoric acid was examined by using the cellulose acetate films thus prepared. Table 4 shows the results. The evaluation test was conducted according to the methods in the above-mentioned acetic acid concentration measurement and the acetic acid odor level evaluation.

TABLE 4

Relationship between Acetic Acid
Odor Level and Addition Amount of
Phosphoric Acid of Cellulose
Acetate Films
(Reaction Controlling Agent:
Polyvinyl-pyrrolidone
(Addition Amount of 10% by weight))

| Addition Amount of Phosphoric Acid (% by weight) | Acetic Acid Concentration (ppm) | Acetic Acid Odor Level |
|---|---|---|
| 1 | 0.9 | 0 |
| 5 | 1.7 | 0–1 |

It is seen from the results given above that it is possible to set the generation level of the acetic acid odor as a desired value by selecting the adding amount of the reaction controlling agent.

EXAMPLE 12

A cellulose acetate film was prepared as in Example 3, except that the addition amount of N-methylmorpholine N-oxide was changed to 1% by weight of the cellulose acetate, and that the addition amount of phosphoric acid was changed to 1% by weight of the cellulose acetate.

The relationship between the acetic acid odor level of the cellulose acetate film and the addition amount of phosphoric acid was examined by using the cellulose acetate films thus prepared. Table 5 shows the results. The evaluation test was conducted according to the methods in the above-mentioned acetic acid concentration measurement and the acetic acid odor level evaluation.

TABLE 5

Relationship between Acetic Acid
Odor Level and Addition Amount of
Phosphoric Acid of Cellulose
Acetate Films
(Reaction Controlling Agent:
N-methyl-morpholine N-oxide
(Addition Amount of 1% by weight))

| Addition Amount of Phosphoric Acid (% by weight) | Acetic Acid Concentration (ppm) | Acetic Acid Odor Level |
|---|---|---|
| 1 | 0.3 | 0 |
| 5 | 3.2 | 1 |

It is seen from the results given above that it is possible to set the generation level of the acetic acid odor at a desired value by selecting the addition amount of the reaction controlling agent.

<Acidity When Cellulose Acetate Film is Brought Into Contact with Water>

The acidity was evaluated in the case where each of the cellulose acetate films prepared in Examples 1, 3, 5 and 7, and Comparative Examples 1–3 was brought into contact with a large amount of water. Specifically, a circular piece (a diameter of 5 cm) was punched out from the film as formed, and was kept dipped in 100 mL of water for one day at room temperature so as to measure the pH value of the dipping water by an ordinary pH meter. Table 6 shows the results.

TABLE 6

Result of Acidity Evaluation When Cellulose Acetate Film was Contacted with Water

| Sample | pH Value of Dipping Water |
| --- | --- |
| Example 1 | 2.3 |
| Example 3 | 4.4 |
| Example 5 | 2.5 |
| Example 7 | 4.5 |
| Comparative Example 1 | 2.3 |
| Comparative Example 2 | 2.5 |
| Comparative Example 3 | 6.3 |

It is seen from the results given above that the decomposition accelerating agent exhibits its function without being affected by the reaction controlling agent that is used together in any of the Examples, if contacted with a large amount of water. In other words, it is seen that the composite material of the decomposition accelerating agent with the reaction controlling agent contained in the cellulose acetate composition of the present invention release its interaction by a large amount of water so as to liberate the decomposition accelerating agent into free state.

<Evaluation of Biodegradability>

The biodegradability of each of the cellulose acetate films prepared in Examples 1, 2, 3, 5 and 6, and Comparative Examples 1–3 was evaluated. Specifically, a circular piece (a diameter of 5 cm) was punched out of each of these cellulose acetate films formed and buried in soil so as to measure the rate of decrease in weight of the film 60 days later. The rate of decrease in weight was calculated on the basis of the film weights (dry weight) both before and after the film was buried in soil. Table 7 shows the results.

TABLE 7

Evaluation Result of Biodegradability of Cellulose Acetate Films

| Sample | Weight Decrease Rate (%) | Outer Appearance of Film |
| --- | --- | --- |
| Example 1 | 41.6 | Brittle and broken into small pieces; Prominent in vermicular traces |
| Example 2 | 37.1 | Brittle and broken into small pieces; Prominent in vermicular traces |
| Example 3 | 30.1 | Brittle and broken into small pieces; Prominent in vermicular traces |
| Example 5 | 27.9 | Brittle and broken into small pieces; Prominent in vermicular traces |
| Example 6 | 29.3 | Brittle and broken into small pieces; Prominent in vermicular traces |
| Comparative Example 1 | 17.5 | Brittle and broken into small pieces; Prominent in vermicular traces |
| Comparative Example 2 | 21.0 | Brittle and broken into small pieces; Prominent in vermicular traces |
| Comparative Example 3 | 3.0 | No prominent change |

It is seen from the results given above that the biodegradation rate of the cellulose acetate composition was promoted in each of the Examples. In other words, it is seen that, the combined use of a reaction controlling agent serving to suppress the acetic acid odor does not adversely affect the effect of promoting the biodegradation rate of cellulose acetate produced by the decomposition accelerating agent.

As described above, the present invention provides a cellulose acetate molded article which is capable of suppressing the change with time in the DS value of the cellulose acetate and suppressing generation of an acetic acid odor, and which is also excellent in biodegradability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A molded article molded from biodegradable cellulose acetate composition comprising, contained in cellulose acetate, a composite material of a decomposition accelerating agent formed of at least one compound selected from the group consisting of oxygen acid of sulfur, oxygen acid of nitrogen, a partial ester or hydrogen salt of these oxygen acids, carbonic acid and its hydrogen salt, a sulfonic acid, a carboxylic acid, a phosphoric acid, a polyphosphoric acid, a phytic acid, a starch phosphate, a cellulose phosphate, a calcium hydrogenphosphate, a di-2-ethylhexyl phosphate, a phosphoric ester of 2-hydroxyethyl methacrylate and homopolymers thereof and copolymers thereof, a phosphoric ester of 2-hydroxyethyl phenyl methacrylate and homopolymers thereof and copolymers thereof, and an alkyl phosphoric ester of 2-hydroxyethyl methacrylate and homopolymers thereof and copolymers thereof, and a reaction controlling agent formed of a compound having an oxazolidone structure.

2. The molded article of claim 1, wherein said decomposition accelerating agent is phosphoric acid or calcium hydrogenphosphate.

3. The molded article of claim 1, wherein said reaction controlling agent is selected from the group consisting of 2-oxazolidone, 3-methyl-2-oxazolidone and polyvinyl oxazolidone.

4. A molded article molded from biodegradable cellulose acetate composition comprising, contained in cellulose acetate, a composite material of a decomposition accelerating agent formed of at least one compound selected from the group consisting of oxygen acid of sulfur, oxygen acid of nitrogen, a partial ester or hydrogen salt of these oxygen acids, carbonic acid and its hydrogen salt, a sulfonic acid, a carboxylic acid, a phosphoric acid, a polyphosphoric acid, a phytic acid, a starch phosphate, a cellulose phosphate, a calcium hydrogenphosphate, a di-2-ethylhexyl phosphate, a phosphoric ester of 2-hydroxyethyl methacrylate and homopolymers thereof and copolymers thereof, a phosphoric ester of 2-hydroxyethyl phenyl methacrylate and homopolymers thereof and copolymers thereof, and an alkyl phosphoric ester of 2-hydroxyethyl methacrylate and homopolymers thereof and copolymers thereof, and a reaction controlling agent, wherein said reaction controlling agent is selected from the group consisting of 2-oxazolidone, 3-methyl-2-oxazolidone, polyvinyl oxazolidone, N-methylmorpholine N-oxide, N-methyl piperidine N-oxide, and triethyl amine N-oxide.

5. A tobacco filter plug comprising cellulose acetate fibers containing, in at least a surface region thereof, a composite material of a decomposition accelerating agent and a reaction controlling agent, wherein said decomposition accelerating agent is phosphoric acid or calcium hydrogenphosphate, and said reaction controlling agent is a compound having an oxazolidone structure.

6. The tobacco filter plug of claim 5, wherein said reaction controlling agent is selected from the group consisting of 2-oxazolidone, 3-methyl-2-oxazolidone and polyvinyl oxazolidone.

7. A molded article molded from a biodegradable cellulose acetate composition comprising, contained in cellulose acetate, a composite material of a decomposition accelerating agent formed of at least one compound selected from the group consisting of phosphoric acid and calcium hydrogenphosphate, and a reaction controlling agent formed of at least one compound selected from the group consisting of a compound having a pyrrolidone structure and a compound having an oxazolidone structure.

8. The molded article according to claim 7, wherein said reaction controlling agent is the compound having a pyrrolidone structure.

9. The molded article of claim 8, wherein said reaction controlling agent is selected from the group consisting of 2-pyrrolidone, N-methyl-2-pyrrolidone and polyvinylpyrrolidone.

10. A tobacco filter plug comprising cellulose acetate fibers containing, in at least a surface region thereof, a composite material of a decomposition accelerating agent containing at least one compound selected from the group consisting of phosphoric acid and calcium hydrogenphosphate, and a reaction controlling agent containing at least one compound selected from the group consisting of a compound having a pyrrolidone structure and a compound having an oxazolidone structure.

11. The tobacco filter plug of claim 10, wherein said reaction controlling agent is the compound having a pyrrolidone structure.

12. The tobacco filter plug of claim 11, wherein said reaction controlling agent is selected from the group consisting of 2-pyrrolidone, N-methyl-2-pyrrolidone and polyvinylpyrrolidone.

* * * * *